(12) United States Patent
Strasdat et al.

(10) Patent No.: US 10,714,055 B1
(45) Date of Patent: Jul. 14, 2020

(54) SYSTEMS AND METHODS FOR DISPLAY SYNCHRONIZATION IN HEAD-MOUNTED DISPLAY DEVICES

(71) Applicant: Oculus VR, LLC, Menlo Park, CA (US)

(72) Inventors: Hauke Malte Strasdat, Kirkland, WA (US); Richard Andrew Newcombe, Seattle, WA (US); Jeffrey Scott Campeau, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 111 days.

(21) Appl. No.: 16/008,623

(22) Filed: Jun. 14, 2018

(51) Int. Cl.
*G09G 5/12* (2006.01)
*G09G 5/00* (2006.01)
*H04N 5/247* (2006.01)
*G06K 19/06* (2006.01)
*G06F 3/01* (2006.01)

(52) U.S. Cl.
CPC ......... *G09G 5/12* (2013.01); *G06K 19/06037* (2013.01); *G09G 5/006* (2013.01); *H04N 5/247* (2013.01); *G06F 3/012* (2013.01); *G09G 2320/0261* (2013.01); *G09G 2320/0693* (2013.01); *G09G 2370/20* (2013.01)

(58) Field of Classification Search
CPC .. G09G 5/12; G09G 5/006; G09G 2320/0261; G09G 2320/0693; G09G 2370/20; G06K 19/06037; H04N 5/247; G06F 3/012
See application file for complete search history.

(56) References Cited

U.S. PATENT DOCUMENTS

| | | | | |
|---|---|---|---|---|
| 9,182,599 B2 * | 11/2015 | Yang | ............ | G02B 27/017 |
| 2002/0113756 A1 * | 8/2002 | Tuceryan | ......... | G02B 27/017 345/8 |
| 2014/0362446 A1 * | 12/2014 | Bickerstaff | ....... | G02B 27/017 359/630 |
| 2018/0082482 A1 * | 3/2018 | Motta | .......... | G02B 27/0172 |
| 2019/0349576 A1 * | 11/2019 | Yildiz | ........... | G02B 27/0149 |

OTHER PUBLICATIONS

Stuart Gilson et al. (High Fidelity Immersive Virtual Reality, Virtual Reality—Human Computer Interaction, Sep. 2012; Edition: 1st, Chapter: 3, Publisher: InTech, pp. 42-58) (Year: 2012).*

* cited by examiner

*Primary Examiner* — Stacy Khoo
(74) *Attorney, Agent, or Firm* — FisherBroyles, LLP

(57) ABSTRACT

The disclosed computer-implemented method may include directing a head-mounted display system to render, within a frame generated by the head-mounted display system, at least one performance metric for the frame. The method may also include recording when the frame containing the performance metric is displayed by a display of the head-mounted display system, measuring, based at least in part on when the frame containing the performance metric was displayed, at least one aspect of the head-mounted display system's performance, and calibrating the head-mounted display system based on the measurement. Various other methods, calibration systems, and computer-readable media are also disclosed.

20 Claims, 8 Drawing Sheets

SYSTEMS AND METHODS FOR DISPLAY SYNCHRONIZATION IN HEAD-MOUNTED DISPLAY DEVICES

BACKGROUND

Artificial reality systems, including virtual reality (VR) systems and augmented reality (AR) systems, may enable users to have more immersive experiences than ordinary television or video gaming can provide. While wearing a head-mounted display (HMD), a user can view different portions of a captured scene or an artificially generated scene simply by moving his or her head, just as the user naturally does to view a real-world environment. Additionally, a user can view a real-world scene directly and have added descriptive, informative, or instructive information presented in context on top of or alongside the real-world scene.

When using an HMD, an artificially generated scene or feature may be presented in the HMD to the user based on the position and orientation of the user's head. In order to present the displayed scenes or features to users in a way that feels natural to the user, the displayed scene or added features should change based on changes in the position and orientation of the user's head. However, when the user moves the HMD to view some other part of an artificial or real-world scene, the displayed scene or features can become separated from the user's movements if the HMD is not able to accurately synchronize the display with the HMD's movements. This lack of synchronization may degrade the user's experience.

SUMMARY

As will be described in greater detail below, the instant disclosure describes systems and method for calibrating an HMD system to improve the correlation between an external, real-world environment and augmented or virtual elements. In one example, a method for calibrating a head-mounted display system may include directing the head-mounted display system to render, within a frame generated by the head-mounted display system, at least one performance metric for the frame. The method may also include (1) recording when the frame containing the performance metric is displayed by a display of the head-mounted display system, (2) measuring, based at least in part on when the frame containing the performance metric was displayed, at least one aspect of the head-mounted display system's performance, and (3) calibrating the head-mounted display system based on the measurement.

In some implementations, directing the head-mounted display system to render the performance metric within the frame may include directing the head-mounted display system to render a machine-readable representation of the performance metric within the frame. The machine-readable representation may include a numeral and/or a binary code. The binary code may include a two-dimensional barcode, such as a QuickResponse ("QR") code or an AprilTag. Recording when the frame containing the performance metric is displayed may include capturing an image of the displayed frame using a camera that is positioned approximately where a user's eyes would be positioned with respect to the display when the head-mounted display system is in use by the user and recording, using a timestamp, when the image of the displayed frame was captured by the camera. The performance metric may include a predicted display time that identifies a predicted point in time when the head-mounted display system will display the frame on the display of the head-mounted display system, a frame identifier (such as an increasing counter) that identifies the frame, and/or a synchronization value that identifies synchronization errors between the display and a graphics processing unit of the head-mounted display system.

In some implementations, measuring at least one aspect of the head-mounted display system's performance may include determining, using the timestamp obtained from the camera that captured the displayed frame, an actual display time for the frame and then comparing the actual display time with the predicted display time. Measuring at least one aspect of the head-mounted display system's performance may include using the frame identifier to identify the frame within a sequence of frames reported by a subsystem of the head-mounted display system. The method may also include directing the head-mounted display system to render the performance metric for each of a plurality of additional frames generated by the head-mounted display system and recording when the additional frames containing the performance metric are displayed by the display of the head-mounted display system. The measurement of at least one aspect of the head-mounted display system's performance may be based at least in part on an aggregation of when the additional frames containing the performance metric were displayed.

In some implementations, directing the head-mounted display system to render the performance metric within the frame may include directing the head-mounted display system to render frames at a frequency that is higher than a frame rate of an image sensor used by the head-mounted display system to capture the frame and/or directing the head-mounted display system to display the performance metric for an amount of time that is approximately equal to an exposure length of an image sensor used by the head-mounted display system to capture the frame. Calibrating the head-mounted display system may include calibrating the display of the head-mounted display system, a sensor of the head-mounted display system, a display-rendering property of the head-mounted display system, and/or a display-timing property of the head-mounted display system.

A corresponding calibration system for a head-mounted display system may include at least one memory device and a physical processor that, when executing instructions contained within the memory device, causes the calibration system to direct the head-mounted display system to (1) render, within a frame generated by the head-mounted display system, at least one performance metric for the frame, (2) record when the frame containing the performance metric is displayed by a display of the head-mounted display system, and (3) measure, based at least in part on when the frame containing the performance metric was displayed, at least one aspect of the head-mounted display system's performance. The physical processor may further cause the calibration system to calibrate the head-mounted display system based on the measurement.

In some implementations, the calibration system may include a camera subsystem that is positioned to approximate a position of a user's eyes with respect to the display when the head-mounted display system is in use by the user. The camera subsystem may include a pair of cameras that are positioned to approximate positions of the user's eyes with respect to the display when the head-mounted display system is in use by the user. The display may include a first display and a second display. The calibration system may also include a first camera within the pair of cameras that is configured to capture images of frames displayed by the first display. The calibration system may also include a second camera within the pair of cameras that is configured to capture images of frames displayed by the second display. In some examples, the calibration system may be configured to calibrate the first display independent of the second display.

In another example, a tangible, non-transitory computer-readable medium may have instructions stored thereon, that when executed by a physical processor, cause the physical processor to perform operations that may include (1) directing a head-mounted display system to render, within a frame generated by the head-mounted display system, at least one performance metric for the frame, (2) recording when the frame containing the performance metric is displayed by a display of the head-mounted display system, (3) measuring, based at least in part on when the frame containing the performance metric was displayed, at least one aspect of the head-mounted display system's performance, and (4) calibrating the head-mounted display system based on the measurement.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
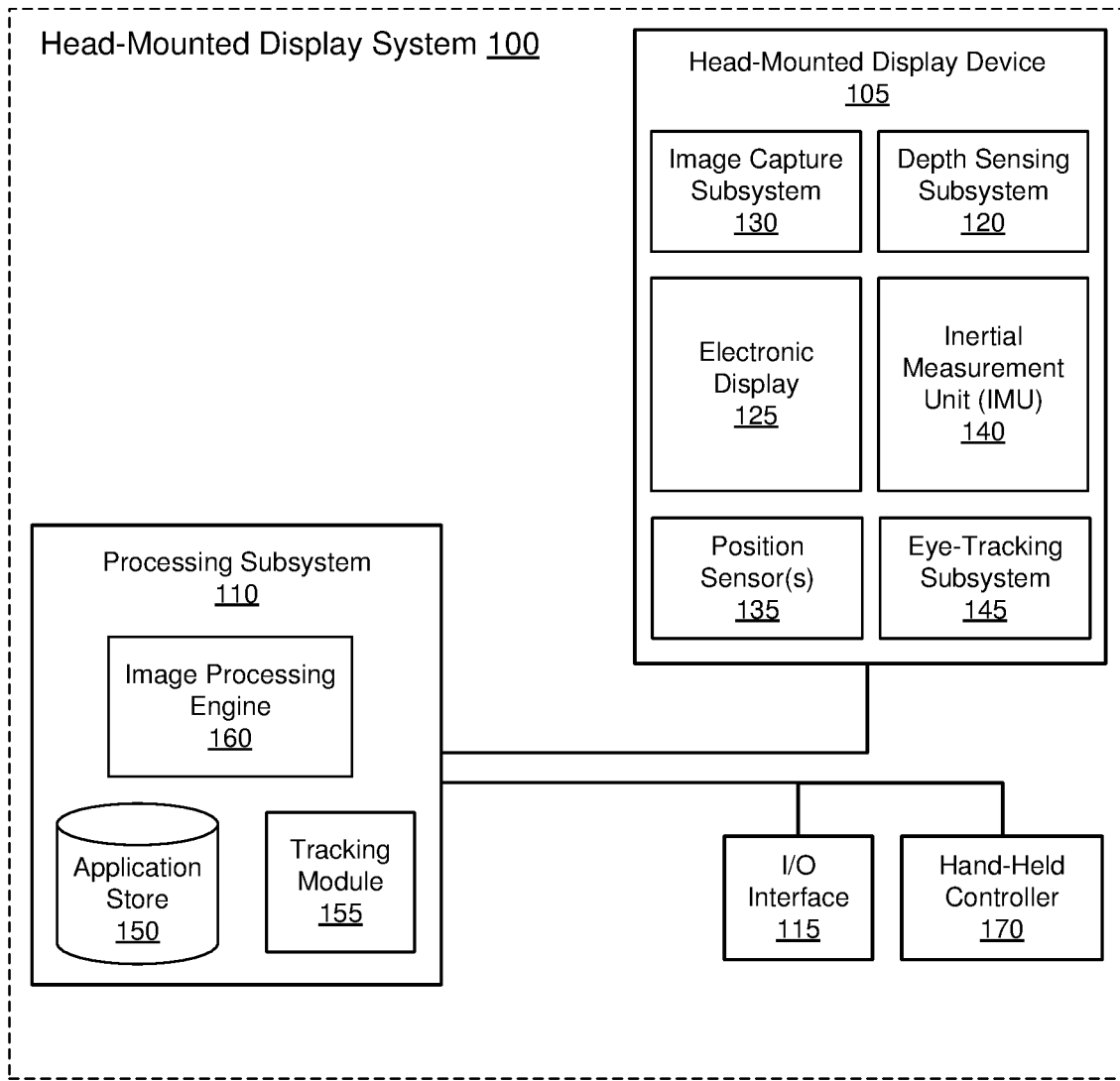
FIG. 1 is a block diagram of an exemplary head-mounted display (HMD) system, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for calibrating an HMD device so that the HMD device can accurately display computer-generated imagery in a manner that is correctly synchronized with an external real-world environment. As detailed above, augmented reality HMD devices often provide a direct view of a real-world environment and project or display information on top of that direct view to augment the same. This augmentation can alter or mask the appearance of aspects of the direct view. For example, the augmentation can add a virtual vase of flowers onto a real-world table or add a virtual table cloth onto a real-world table that lacks the same. As another example, an HMD device can augment a scene of a surgery by labelling or highlighting physiological structures and/or providing relevant physiological data, such as pressure or flow rates. This added information may provide a surgeon or other clinician with guidance to perform the surgery.

While wearing an HMD device, a user may turn his or her head to focus his or her view on a new location. When the user's head changes the position and/or orientation of the HMD device, the display should be updated in a way that accurately corresponds to the real-world environment. For example, as the user's head moves, a virtual table cloth should remain in position on a table or a guideline labelling an artery should remain pointing to the labelled artery. In order for an HMD system to accurately display such visualizations (including accurately predicting what frames should be displayed at what time), the HMD system must have each of its various components (including its display, sensors, and/or tracking subsystems) precisely calibrated. By doing so, the system may be able to accurately sync visualizations with both a user's movements and the user's environment. Unfortunately, the precise timing requirements involved in such a process may make calibrating all of the many components involved in such a system incredibly challenging.

As will be explained in greater detail below, the present disclosure describes various systems and methods for calibrating the various components within an HMD system in order to enable the HMD system to accurately display or sync computer-generated imagery with images captured from a real-world environment. In one example, a calibration system designed to accomplish such a task may simulate a scene in a way that encodes information that can be captured and processed to determine time delays introduced by various components of the HMD system. For example, embodiments of the present disclosure may involve directing the calibration system to cause an HMD system to render, within a frame generated by the HMD system, at least one performance metric (e.g., a predicted display time, a frame counter, a timestamp, vertical synchronization (VSYNC) errors, etc.) for the frame. In this example, the calibration system may record when the frame containing the performance metric is actually displayed by a display of the HMD system (by, e.g., recording the displayed frame using a test camera positioned where a user's eyes would be positioned when wearing the HMD). The calibration system may then measure at least one aspect of the head-mounted display system's performance based at least in part on when the frame containing the performance metric was actually displayed by the display. The testing apparatus may then calibrate the HMD system based on the measurement (or based on a plurality of such measurements). As will be explained in greater detail below, this calibration may enable the HMD system to accurately perform a variety of tasks, such as accurately predicting when a certain frame will be rendered to ensure that the appropriate frame is produced and queued for rendering and display to the user, resulting in a more accurate or natural view for the end user.

The following will provide, with reference to FIGS. 1-8, detailed descriptions of the systems and methods that can be used to calibrate for display-to-sensor synchronization, such that computer-generated imagery can be accurately synced with a user's movements and/or environment.

FIG. 1 is a block diagram of one embodiment of an HMD system 100 capable of presenting scenes (e.g., captured scenes, artificially generated scenes, or a combination of the same) to a user. The HMD system 100 may operate in a virtual reality (VR) system environment, an augmented reality (AR) system environment, a mixed reality (MR) system environment, or some combination thereof. As shown in FIG. 1, the HMD system 100 may include an HMD device 105 that includes or communicates with a processing subsystem 110 and an input/output (I/O) interface 115. The processing subsystem 110 and/or the I/O interface 115 may be integrated within the HMD device 105 and/or may represent standalone components that are external to or integrated within separate systems, such as an external computing device. In some embodiments, the HMD device 105 may provide for a direct view of the real-world environment while augmenting that view with a see-through display. Other embodiments may partially obstruct the user's view of the real-world environment and/or may obstruct the user's view depending on content being displayed in a display of the HMD device 105.

While FIG. 1 shows an exemplary HMD system 100 that includes at least one HMD device 105 and at least one processing subsystem 110 and I/O interface 115, in other embodiments any number of these components may be included in the HMD system 100. For example, there may be multiple HMDs 105, each having an associated I/O interface 115, with each HMD device 105 and I/O interface 115 communicating with the processing subsystem 110. In embodiments in which the processing subsystem 110 is not included within or integrated with the HMD device 105, the HMD device 105 may communicate with the processing subsystem 110 over a wired connection or a wireless connection. In alternative configurations, different and/or additional components may be included in the HMD system 100. Additionally, functionality described in connection with one or more of the components shown in FIG. 1 may be distributed among the components in a different manner than described with respect to FIG. 1, in some embodiments.

The HMD device 105 may be used to present a variety of content to a user, including virtual views of an artificially rendered virtual-world environment and/or augmented views of a physical, real-world environment, augmented with computer-generated elements (e.g., two-dimensional (2D) or three-dimensional (3D) images, 2D or 3D video, sound, etc.). In some embodiments, the presented content may include audio that is presented via an internal or external device (e.g., speakers and/or headphones) that receives audio information from the HMD device 105, the processing subsystem 110, or both, and presents audio data based on the audio information. In some embodiments, such speakers and/or headphones may be integrated into or releasably coupled or attached to the HMD device 105. The HMD device 105 may also include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other. The HMD device 200 shown in FIG. 2 (described in further detail below) represents one potential and exemplary embodiment of HMD device 105.

In some examples, the HMD device 105 may include a depth-sensing subsystem 120 (or depth camera system), an electronic display 125, an image capture subsystem 130 that includes one or more cameras, one or more position sensors 135, and/or an inertial measurement unit (IMU) 140. Some embodiments of the HMD device 105 may have different components than those described in conjunction with FIG. 1.

The depth-sensing subsystem 120 may capture data describing depth information characterizing a local real-world area or environment surrounding some or all of the HMD device 105 and/or characterizing a position or velocity of the depth-sensing subsystem 120 (and thereby of the HMD device 105 and the user) within the local area. The depth-sensing subsystem 120 can compute the depth information using collected data (e.g., based on captured light according to one or more computer-vision schemes or algorithms, by processing a portion of a structured light pattern, by time-of-flight (ToF) imaging, simultaneous localization and mapping (SLAM), etc.) or the depth-sensing subsystem 120 can transmit this data to another device such as an external implementation of the processing subsystem 110 that can determine the depth information using the data from the depth-sensing subsystem 120.

The electronic display 125 may display two-dimensional or three-dimensional images to the user in accordance with data received from the processing subsystem 110. The electronic display 125 may include a single electronic display or multiple electronic displays (e.g., a display for each eye of a user). Examples of the electronic display 125 may include a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, another suitable display, or some combination thereof. In some examples, the electronic display 125 may be optically transparent such that the user can see the local environment through the display 125 or the display 125 may be opaque such that the user cannot see the local environment through the electronic display 125. When the display 125 is opaque, the display 125 may be situated so that it projects images toward a transparent combiner. The combiner may then redirect the projected images toward a user's eyes while simultaneously allowing the user to view the local environment through the body of the combiner, as is described in more detail below in connection with FIGS. 3-5.

The image capture subsystem 130 may include one or more optical image sensors or cameras that capture and collect image data from a local environment. In some embodiments, the sensors included in the image capture subsystem 130 may provide stereoscopic views of the local environment that may be used by the processing subsystem 110 to generate image data that characterizes the local environment and/or a position and orientation of the HMD device 105 within the local environment. As described herein, the image capture subsystem 130 may provide (using, e.g., RGB cameras) pass-through views of the real-world environment that are displayed to the user via the electronic display 125 when electronic display 125 would otherwise block the user's view of the real-world environment. Image correction or compensation may be performed by the processing subsystem 110 to correct and present captured images to the user with a more natural appearance, so that it appears to the user as if the user is looking through the electronic display 125 of the HMD device 105.

The IMU 140 may, in some examples, represent an electronic subsystem that generates data indicating a position and/or orientation of the HMD device 105 based on measurement signals received from one or more of the position sensors 135 and from depth information received from the depth-sensing subsystem 120 and/or the image capture subsystem 130. For example, a position sensor 135 may generate one or more measurement signals in response to motion of the HMD device 105. Examples of position sensors 135 include one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof. In one example, the HMD 105 may also include an eye-tracking subsystem 145 configured to track the eyes of a user of the HMD device 105 to measure or estimate the user's gaze, interpupillary distance, and/or focal distance. In some embodiments, the HMD 105 may include a varifocal subsystem capable of adjusting the focal distance/length of the HMD system 100 (by, e.g., physically adjusting the distance between the user's eyes and the electronic display 125).

Based on the one or more measurement signals from one or more position sensors 135, the IMU 140 may generate data indicating an estimated current position, elevation, and/or orientation of the HMD device 105 relative to an initial position and/or orientation of the HMD device 105. For example, the position sensors 135 may include multiple accelerometers to measure translational motion (forward/back, up/down, left/right) and multiple gyroscopes to measure rotational motion (e.g., pitch, yaw, roll). As described herein, the image capture subsystem 130 and/or the depth-sensing subsystem 120 may generate data indicating an estimated current position and/or orientation of the HMD device 105 relative to the real-world environment in which the HMD device 105 is used. Based on information from the IMU 140, including the estimated current position, the processing subsystem 110 may also generate an estimated future position for a given time. For example, the processing subsystem 110 may estimate the position and/or orientation of the HMD device 105 at one or more future times, such as 10 milliseconds (ms), 50 ms, or 100 ms from a current time.

The I/O interface 115 may represent a subsystem or device that allows a user to send action requests and receive responses from the processing subsystem 110 and/or a hand-held controller 170. In some embodiments, the I/O interface 115 may facilitate communication with more than one hand-held controller 170. For example, the user may have two hand-held controllers 170, one in each hand. An action request may, in some examples, represent a request to perform a particular action. For example, an action request may be an instruction to start or end capture of image or video data or an instruction to perform a particular action within an application or to start or end a boundary definition state. The I/O interface 115 may include one or more input devices or enable communication with one or more input devices. Exemplary input devices may include a keyboard, a mouse, a hand-held controller, or any other suitable device for receiving action requests and communicating the action requests to the processing subsystem 110.

The processing subsystem 110 may include one or more processing devices or physical processors that provide content to the HMD device 105 in accordance with information received from the depth-sensing subsystem 120, the image capture subsystem 130, the I/O interface 115, and/or the controller 170. In the example shown in FIG. 1, the processing subsystem 110 includes an engine 160, an application store 150, and a tracking module 155. Some embodiments of the processing subsystem 110 may have different modules or components than those described in conjunction with FIG. 1. Similarly, the functions further described below may be distributed among the components of the HMD system 100 in a different manner than described in conjunction with FIG. 1. In one example, the processing subsystem 110 may perform calibration of the various systems in order to properly synchronize the display of images in the electronic display 125 with the movement of the HMD device 105 and the local environment.

The application store 150 may store one or more applications for execution by the processing subsystem 110. An application may, in some examples, represent a group of instructions, that when executed by a processor, generates content for presentation to the user. Content generated by an application may be generated in response to inputs received from the user via movement of the HMD device 105 or the controller 170. Examples of such applications include calibration applications, gaming applications, conferencing applications, video playback applications, or other suitable applications.

In one example, and as described in greater detail below in connection with FIGS. 5-8, the tracking module 155 may calibrate the HMD system 100 using one or more calibration parameters and may adjust one or more calibration parameters to reduce error when determining the position of the HMD device 105 or the hand-held controller 170. For example, the tracking module 155 may communicate a calibration parameter to the depth-sensing subsystem 120 to adjust the focus of the depth-sensing subsystem 120 to more accurately determine positions of structured light elements captured by the depth-sensing subsystem 120. Calibration performed by the tracking module 155 may also account for information received from the IMU 140 in the HMD device 105 and/or another IMU 140 included in the controller 170. Additionally, if tracking of the HMD device 105 is lost (e.g., the depth-sensing subsystem 120 loses line of sight of at least a threshold number of structured light elements), the tracking module 155 may recalibrate some or all of the HMD system 100.

The tracking module 155 may track movements of the HMD device 105 or of the hand-held controller 170 using information from the depth-sensing subsystem 120, the image capture subsystem 130, the one or more position sensors 135, the IMU 140, or some combination thereof. For example, the tracking module 155 may determine a position of a reference point of the HMD device 105 in a mapping of the real-world environment based on information collected by the HMD device 105. Additionally, in some embodiments, the tracking module 155 may use portions of data indicating a position and/or orientation of the HMD device 105 and/or controller 170 from the IMU 140 to predict a future position and/or orientation of the HMD device 105 and/or the hand-held controller 170. The tracking module 155 may also provide the estimated or predicted future position of the HMD device 105 or the I/O interface 115 to the engine 160.

In some embodiments, the tracking module 155 may track other features that can be observed by the depth-sensing subsystem 120, the image capture subsystem 130, and/or by another system. For example, the tracking module 155 may track one or both of the user's hands so that the location of the user's hands within the real-world environment may be known and utilized. The tracking module 155 may also receive information from one or more eye-tracking cameras included in some embodiments of the HMD device 105 to track the user's gaze.

In one example, the image processing engine 160 may generate a three-dimensional mapping of the area surrounding some or all of the HMD device 105 (i.e., the "local area" or "real-world environment") based on information received from the HMD device 105. In some embodiments, the engine 160 may determine depth information for the three-dimensional mapping of the local area based on information received from the depth-sensing subsystem 120 that is relevant for techniques used in computing depth. The engine 160 may also calculate depth information using one or more techniques in computing depth from structured light. In various embodiments, the engine 160 may use the depth information to, for example, update a model of the local area and generate content based in part on the updated model.

The engine 160 may also execute applications within the HMD system 100 and receive position information, acceleration information, velocity information, predicted future positions, or some combination thereof, of the HMD device 105 from the tracking module 155. Based on the received information, the engine 160 may determine content to provide to the HMD device 105 for presentation to the user. For example, if the received information indicates that the user has looked to the left, the engine 160 may generate content for the HMD device 105 that corresponds to the user's movement in a virtual environment or in an environment augmenting the local area with additional content. The engine 160 may also determine individual frames from content that should be presented and specific times based on movement of the HMD device 105 as determined by the IMU 140 and/or the position sensors 135.

Figure 2:
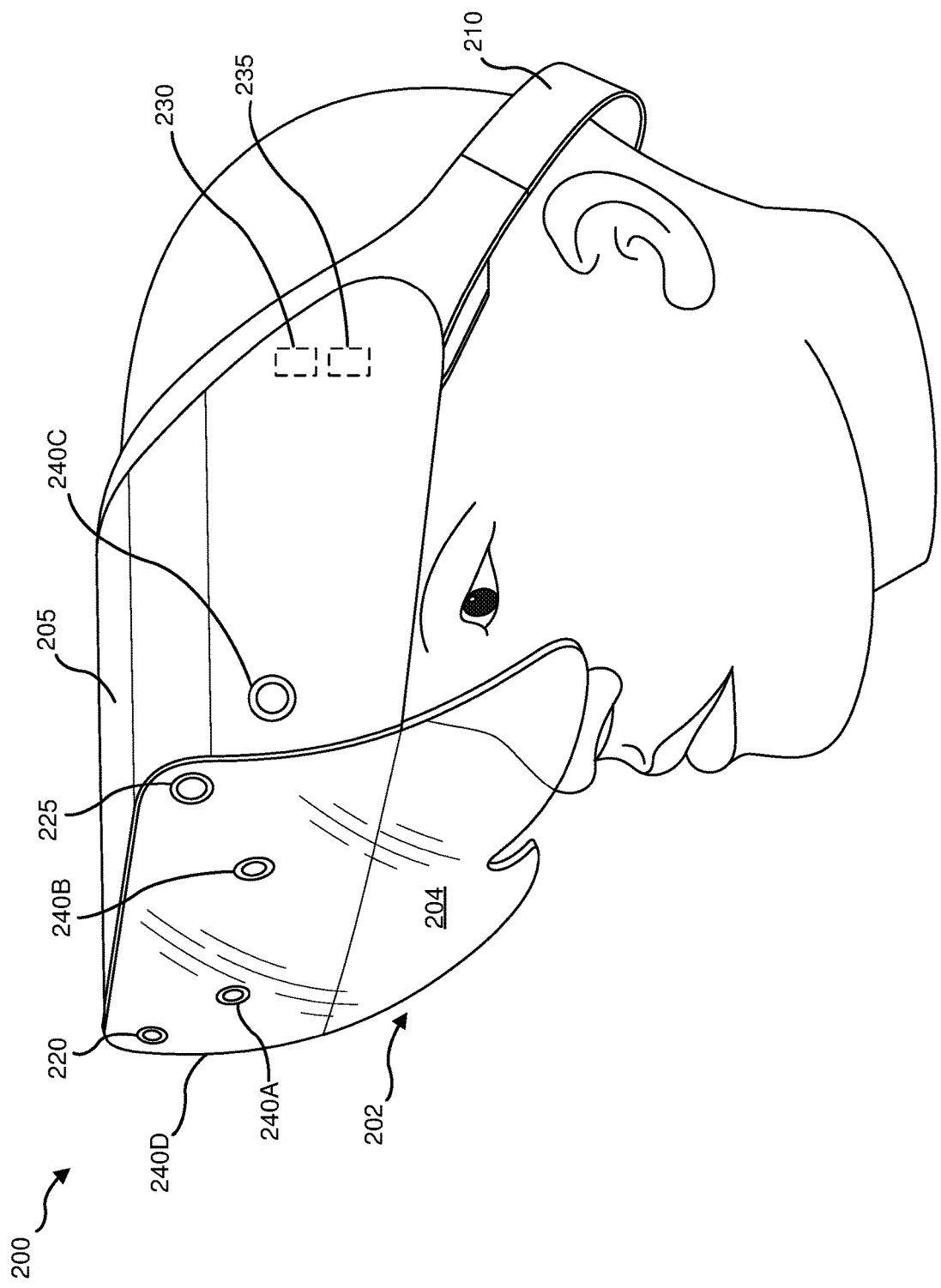
FIG. 2 is a perspective view of an exemplary HMD device that may be included in the HMD system of FIG. 1, according to some embodiments.

FIG. 2 is a diagram of an exemplary HMD device 200 in accordance with one embodiment of the HMD device 105. In one example, the HMD device 200 may include an imaging subsystem and a depth-sensing subsystem. The HMD device 200 may represent or be part of, for example, a VR system, an AR system, an MR system, or some combination thereof. In embodiments that describe an AR system and/or an MR system, portions of a front side 202 of the HMD device 200 may be at least partially transparent in the visible band (e.g., from about 380 nanometers (nm) to about 750 nm). In some embodiments, the front side 202 may include a transparent window 204. In these embodiments, the user may have a direct view through the transparent window 204 into the local environment. As described in greater detail below, the transparent window 204 may include an inner surface that reflects a projected image back to the user's eyes. In other embodiments, the electronic display 125 may be disposed on an inner surface of the window 204. The electronic display 125 may be transparent, allowing the user to see the real-world environment. In other embodiments, the front side 202 may be opaque, preventing the user from seeing the real-world environment.

The HMD device 200 may include a front rigid body 205 housing an electronic display and/or other components from FIG. 1 and a user attachment system such as a band 210 that secures the HMD device 200 to a user's head. The front rigid body 205 may include one or more electronic display elements (e.g., electronic display 125 from FIG. 1), one or more integrated eye-tracking subsystems (e.g., eye-tracking subsystem 145 from FIG. 1), an IMU 230, and one or more position sensors 235. The IMU 230 may represent an electronic device that generates fast calibration data based on measurement signals received from one or more of the position sensors 235. A position sensor 235 may generate one or more measurement signals in response to motion of the HMD device 200.

In addition, the HMD device 200 may include an imaging aperture 220 and an illumination aperture 225. In this example, an illumination source included in the depth-sensing subsystem 120 from FIG. 1 may emit light (e.g., structured light) through the illumination aperture 225. An imaging device of the depth-sensing subsystem 120 may then capture light from the illumination source that is reflected or backscattered from the local area through the imaging aperture 220. The HMD device 200 may also include cameras 240A-240D, which may be components of the image capture subsystem 130 of FIG. 1. In one example, the cameras 240A-240D may be separated from each other by a distance that is different than the average separation distance between users' eyes.

Figure 3:
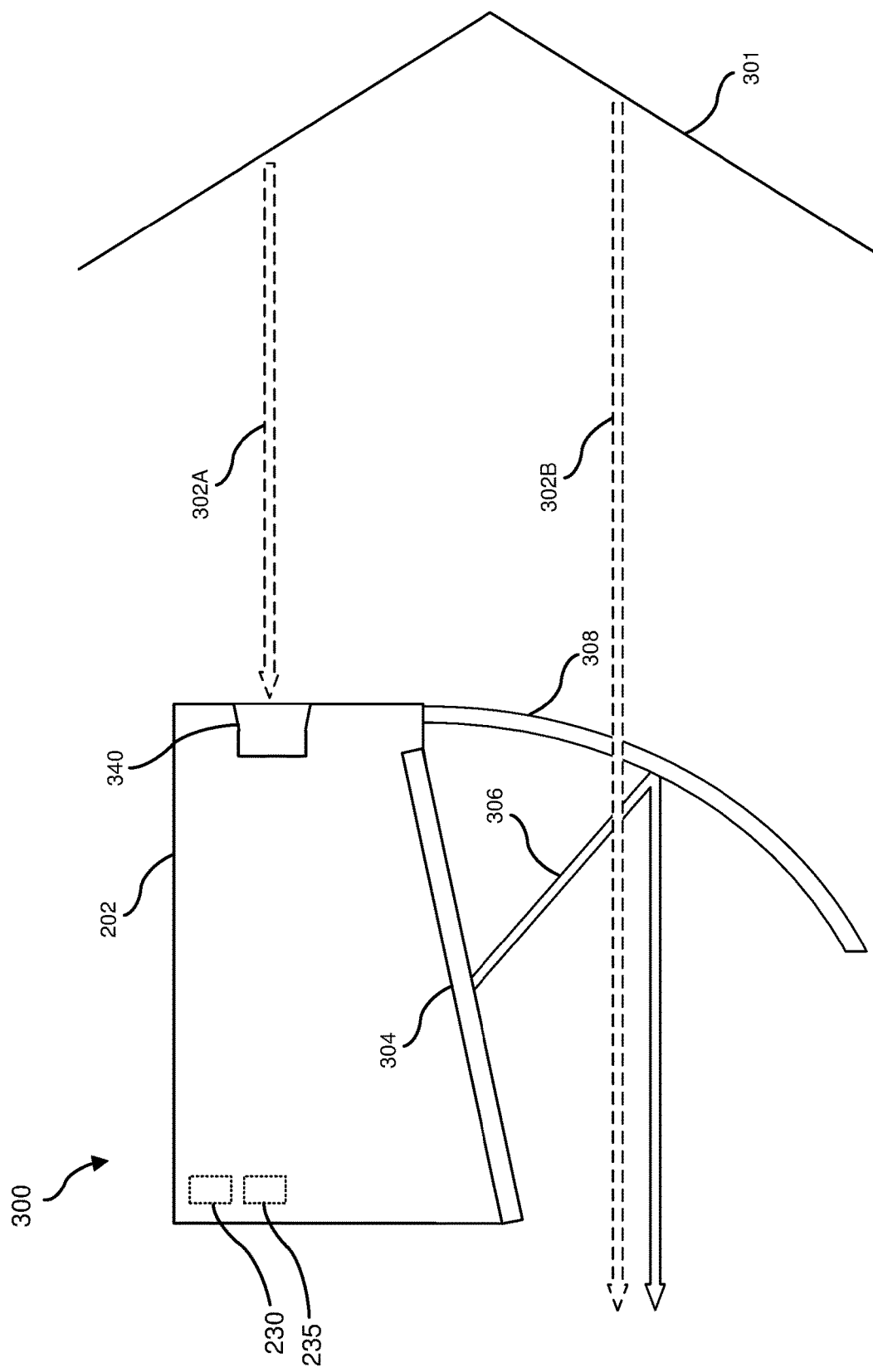
FIG. 3 is a cross-sectional view of an exemplary HMD device that may be included in the HMD system of FIG. 1, according to some embodiments.

FIG. 3 is a cross-sectional diagram of an exemplary HMD device 300, according to some embodiments. The HMD device 300 may share many of the features of the HMD device 200 of FIG. 2, described above. For example, the HMD device 300 may include a camera 340 that captures light 302A from a local environment 301. In some embodiments, the camera 340 may include one or more image sensors, such that the camera 340 is stereoscopic. In other examples, the camera 340 may include more than two image sensors. The HMD device 300 may also include an electronic display 304 secured at an elevation above the user's eyes. The display 304 may be configured to project light 306 toward a combiner 308 and may include more than one display, such as a left-eye display and a right-eye display. In some embodiments, the combiner 308 may have an inner curved surface that focuses the projected light 306 toward the user's eyes. Some embodiments of the HMD device 300 may include additional optical components between the electronic display 304 and the combiner 308 to focus and/or otherwise adjust the projected light 306. In one example, the combiner 308 may be formed from a transparent material to permit light 302B to be received from the local environment 301. The light 302B may provide the user with a direct view of the local environment 301 that is substantially the same as the light 302A.

In some embodiments, the projected light 306 may be brighter than the light 302B, such that light from the electronic display 304 may appear to be in front of or overlaid on the local environment 301. In this way, the HMD device 300 may provide an augmented view of the local environment 301. In some instances, images included in the projected light 306 may be based on features of the local environment, such as objects, corners, walls, etc. For example, projected light 306 may be aligned so as to alter the color or fabric pattern of a sofa positioned within the local environment 301 without substantially altering the size or shape of the sofa. As another example, the projected light 306 may provide the user with a display of locations of pipes within a wall in local environment 301.

In one example, the HMD system 100 may operate so as to maintain the orientation or configuration of projected light 306 with respect to the local environment. For example, the HMD system 100 may operate to keep the display of pipes hidden in the wall in a specific location (corresponding to an actual location of the pipes) with respect to the local environment 301 even while the user changes the location and/or orientation of the HMD device 300 while observing various features of the local environment 301. As detailed above, keeping images produced by the display properly aligned and synchronized with objects in the local environment may require precise calibration of the various components included in the HMD system 100.

Figure 4:
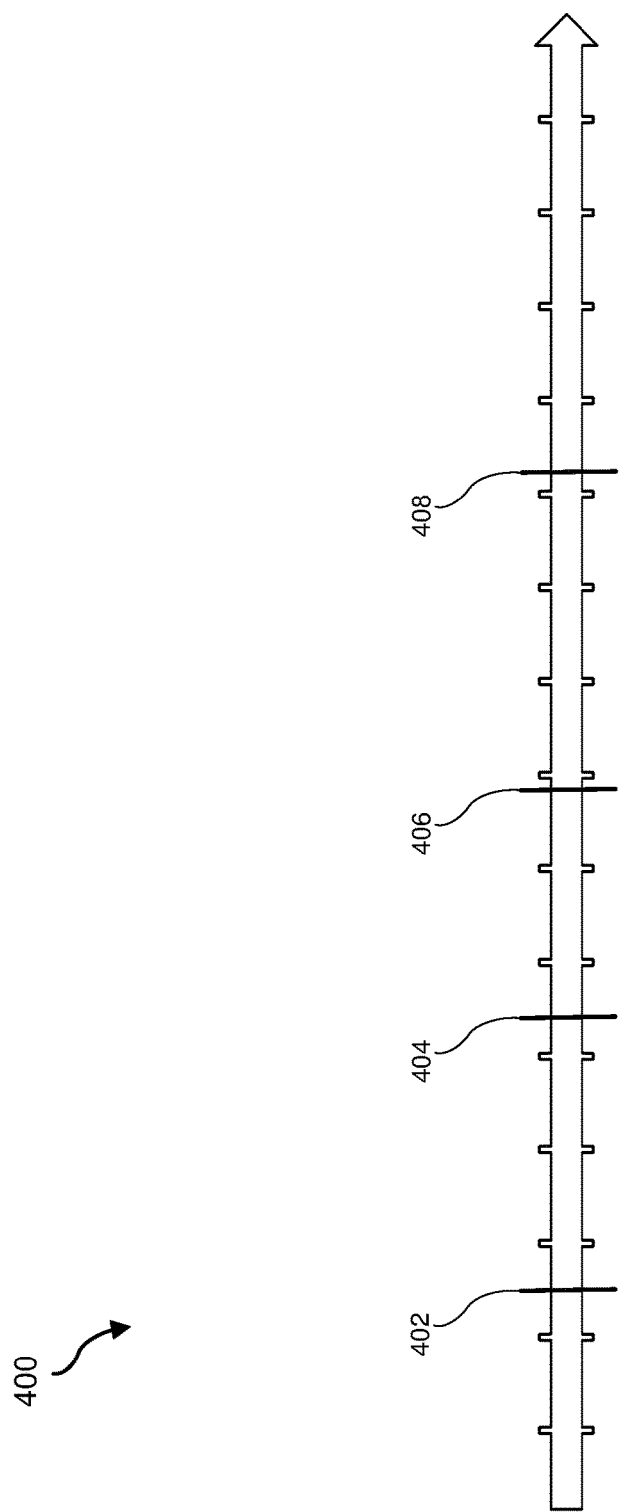
FIG. 4 is a timeline diagram showing exemplary operations of the HMD system of FIG. 1 and the HMD device of FIG. 3, according to some embodiments.

FIG. 4 shows a timeline 400 that illustrates some aspects of time delays that should be carefully calibrated to provide optimized performance of an HMD device. At a time 402, a sensor, like the camera 340 of the HMD device 300, may detect the light 302A received from the local environment 301 in FIG. 3. For example, the camera 340 may sense the light 302A and produce corresponding signals. At a later time 404, the HMD device 300 (in connection with, for example, the processing subsystem 110, the tracking module 155, and/or the engine 160) may produce an estimate of the position and/or orientation of the camera 340 and, thereby, of the HMD device 300 relative to the local environment 301. For example, the camera 340 may be part of a SLAM system that maps the local environment 301 and, at the same time, determines the position and orientation of the HMD device 300 with respect to the environment 301.

At a later time 406, the processing subsystem 110 may generate a prediction as to how an augmenting visual feature should be rendered for presentation by the electronic display 304 to the user of the HMD device 300. For example, the processing subsystem 110 may generate a prediction that a rendered label that was previously displayed at a first location on the electronic display 304 should now be displayed at a second location. At a later time 408, a frame including the rendered label (or any other content frame) may be displayed on the electronic display 304. Each of these times can vary from time to time, from HMD device to HMD device, and from HMD system to HMD system, but proper calibration should provide for an understanding and estimation of each of these stages of presenting synchronized visuals in an AR system. Because an AR system permits a direct view (i.e., no latency) of the local environment 301, high latency associated with the display of augmented visuals may be particularly problematic.

Figure 5:
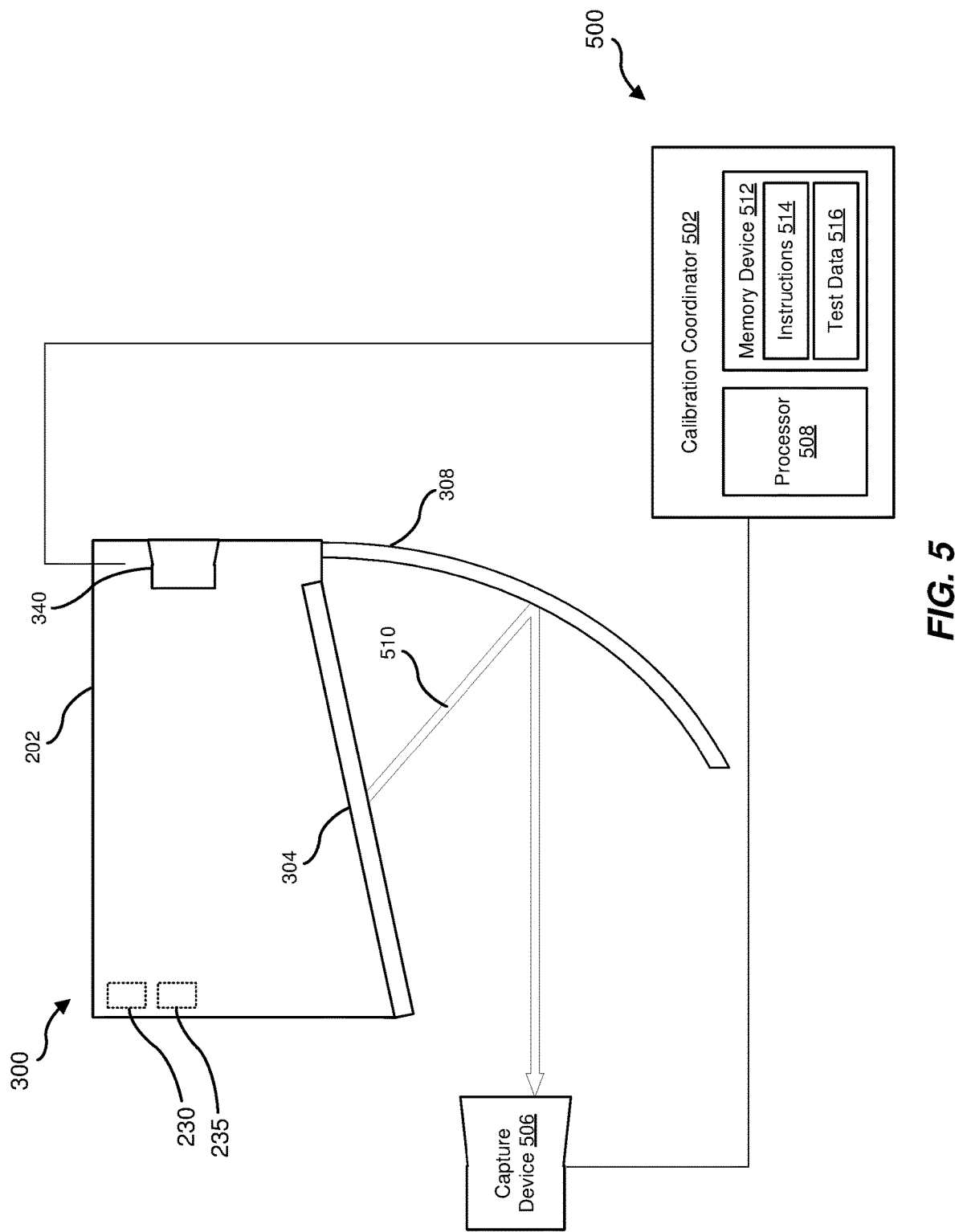
FIG. 5 is a cross-sectional view of the exemplary HMD device of FIG. 3 situated in a calibration system, according to some embodiments.

FIG. 5 is a cross-sectional view of the exemplary HMD device of FIG. 3 situated in a calibration system 500, according to some embodiments. In one example, the calibration system 500 may include multiple components or subsystems capable of facilitating the proper calibration of the HMD device 300, including calibrating for the various time-sensitive stages outlined in connection with FIG. 4 above. This calibration process may, as detailed below, include measuring or calculating one or more values that can be stored in connection with the HMD system 100 and/or the HMD device 300 to provide for an accurate prediction of when a frame will be displayed by the electronic display 125.

As shown in FIG. 5, the calibration system 500 may include a calibration coordinator 502, which may be a computing device including at least one physical processor 508 or microcontroller and a memory device 512 having instructions 514 stored thereon. The memory device 512 may further include test data 516 generated from tests performed during calibration of the HMD device 300. In one example, the test data 516 may include, or be used to generate, calibration parameters that can be transferred to the HMD device 300 for use in operation.

In some embodiments, and as will be explained in greater detail below in FIG. 8, the calibration coordinator 502 may communicate with the HMD device 300 to cause the HMD device 300 to render and/or display various calibration images, such as image 510 shown projected from the electronic display 304. For example, the calibration coordinator 502 may instruct the HMD device 300 to render and display a sequence of calibration frames on the electronic display 304. In this example, the HMD device 300 may include (as, e.g., an AR overlay, as explained below) one or more metrics for evaluating the performance of one or more aspects of the HMD device 300 within one or more of the calibration frames. A capture device 506 positioned approximately where a user's eyes would be positioned when wearing the HMD device 300 may then (1) capture the images displayed by the electronic display 304 during the calibration sequence and (2) relay the captured images to the calibration coordinator 502 for analysis. As described in greater detail below, calibration coordinator 502 may then (1) identify the performance metrics contained within the captured images, (2) measure the performance of one or more aspects of the HMD device 300 based on the same, and (3) calibrate the HMD device 300 accordingly.

In some embodiments, the calibration coordinator 502 may communicate with the HMD device 300 to activate a calibration sequence stored in a memory device of the HMD device 300. In these embodiments, the calibration sequence may cause a sequence of frames to be retrieved from memory or to be produced based on an application or algorithm. For example, the calibration coordinator 502 may instruct the electronic display 304 to emit or project a first image as the image 510 during a first period of time, a second image during a second period of time, a third image during a third period of time, etc. The periods of time during which a particular image is actually shown by the electronic display 304 during this calibration sequence may be both consistent, within normal tolerances, and predetermined. For example, the images projected by the electronic display 304 may each be emitted for a duration of about 1 ms, 2 ms, 5 ms, or 10 ms (or another suitable duration). Similarly, the exposure length of the capture device 506 may be set to about 1 ms, 2 ms, 5 ms, or 10 ms (or another suitable exposure length). In some examples, the sampling rate of the capture device 506 may be about 30 Hz, 59 Hz, 60 Hz, 90 Hz, 120 Hz, or 240 Hz (or some other sample rate) to ensure that each of the projected images is captured.

As detailed above, in some examples the above-described calibration sequence may involve rendering and/or displaying a machine-readable representation of one or more performance metrics within one or more frames generated during the calibration sequence. The term "performance metric" may, in some examples, refer to a value useful in evaluating the performance of one or more aspects of an HMD device. Examples of performance metrics include a predicted display time that identifies a predicted point in time when the HMD device 300 will display the frame on the electronic display 304, a frame identifier (such as a frame counter) that identifies the frame, a synchronization value that identifies synchronization errors (e.g., VSYNC errors) between the electronics display 304 and a graphics processing unit (such as image processing engine 160 in FIG. 1) of the HMD device 300, timestamps that identify the times associated with various events (such as, e.g., when an instruction is sent to the HMD device 300 by the calibration coordinator 502, when the camera 340 captures an image that is to be rendered within a frame, when the electronic display 304 displays a frame (as reported by the display itself), etc.), when the capture device 506 is triggered, and/or any other value that may be useful in evaluating the performance of one or more aspects of the HMD device 300.

Figure 6A:
FIGS. 6A and 6B show exemplary two-dimensional binary codes utilized in some embodiments of the calibration system of FIG. 5, according to some embodiments.
Figure 6B:
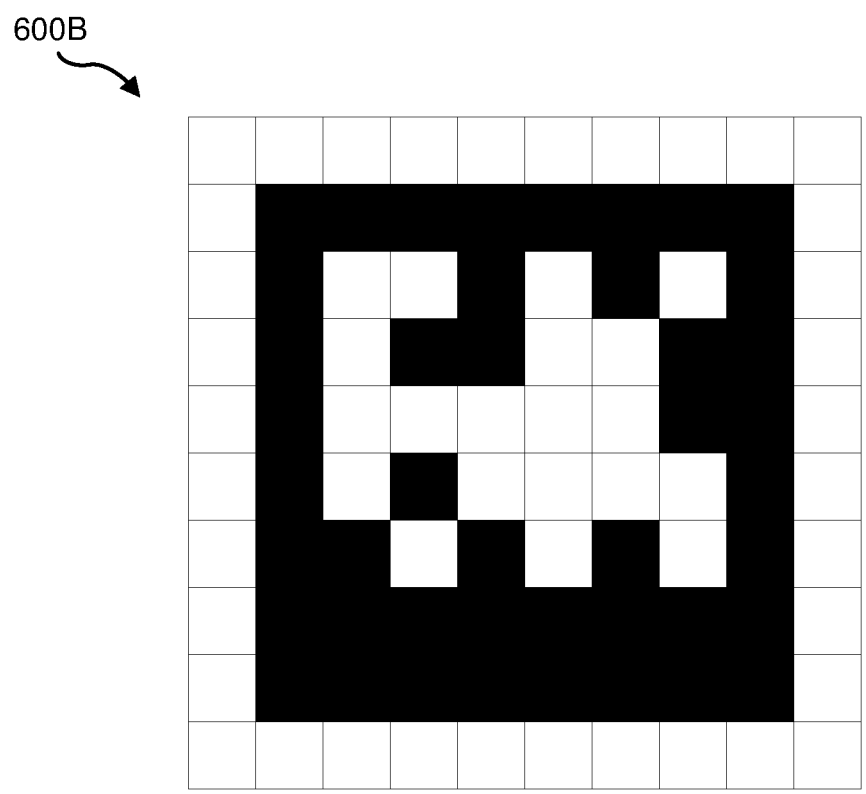

In some embodiments, the machine-readable representation of the performance metric may include a two-dimensional binary code. FIGS. 6A and 6B show exemplary two-dimensional binary codes that may be utilized in some embodiments of the calibration system 500 of FIG. 5. In some embodiments, the calibration coordinator 502 may cause the HMD device 300 to generate the binary codes illustrated in these figures and then include the same within corresponding images 510 projected by the electronic display 304 during calibration. FIG. 6A shows a binary code 600A, commonly referred to as a QuickResponse (QR) code. FIG. 6B shows a binary code 600B, which similarly includes a grid of black or white squares and which is commonly referred to as an AprilTag. AprilTags may be used as visual fiduciary markers that can be utilized in determining the location and orientation of an object. In some embodiments, the binary codes 600A and/or 600B may contain encoded information in a particular pattern of black and white squares or other regions.

Returning to FIG. 5, the binary code included in the image 510 produced by the electronic display 304 may represent or include a performance metric. For example, the binary code included in the image 510 may include, identify, or be associated with a timestamp, sequence number (such as a frame counter), or other performance metric such that, when the capture device 506 captures the image 510, the captured image 510 can be processed to determine the timestamp, sequence number, or performance value. In some examples, this may be done by reference to a database or table associating particular binary codes with particular timestamps, sequence numbers, or other values. In embodiments that associate binary codes with a known sequence of binary codes, the electronic display 304 may cycle through the sequence during calibration. In other embodiments, the particular pattern of the binary code may include encoded information, such as a string or strings of alphanumeric characters that indicate a timestamp, sequence number, or other value.

In one example, the calibration coordinator 502 may include a system clock capable of generating timestamps indicative of the times associated with various calibration-related events, such as when the instruction to the HMD device 300 is sent by the calibration coordinator 502, when the capture device 506 is triggered, etc. Similarly, the HMD device 300 may include a system clock capable of generating timestamps indicative of the times associated with various HMD-related events, such as when the camera 340 captures an image to be rendered within a frame, when the electronic display 304 actually displays a frame (as reported by the display itself), etc. In some examples, one or more of these timestamps may be encoded or otherwise included within the above-described binary codes.

By monitoring the timing of various events during the display of a sequence of images that include such binary codes, calibration data can be generated. In some embodiments, the number of binary codes in the sequence of images may include, for example, 200, 500, 800, or some other predefined number. Other embodiments may include more or fewer binary codes in the sequence of images. The sequence may be cycled multiple times, so that, for example, 1,000, 5,000, 10,000, or more measurement samples can be obtained. A large number of samples may be used to ensure data validity even when there are differences between the frequencies of image capture by the capture device and the rendering by the display, which may cause the display/capture processing to go in and out of phase. This large number of samples may also improve the fault tolerance of the disclosed system, enabling the system to compensate for non-conforming samples and/or gaps in the sample stream.

In some examples, the samples may be sorted into a histogram for analysis. For example, if the image 510 is shown for about 2 ms and the exposure time of the capture device 506 is about 2 ms, the accuracy of a measurement of when an image 510 is displayed may be ±2 ms. By taking a suitable number of measurement samples (e.g., 5,000, 10,000, 20,000, or some other predefined number), however, the median of the distribution of the histogram may be used to accurately calibrate the display time prediction. In this way, the accuracy of predictions as to when a frame to be displayed will actually be displayed can be improved.

Figure 7A:
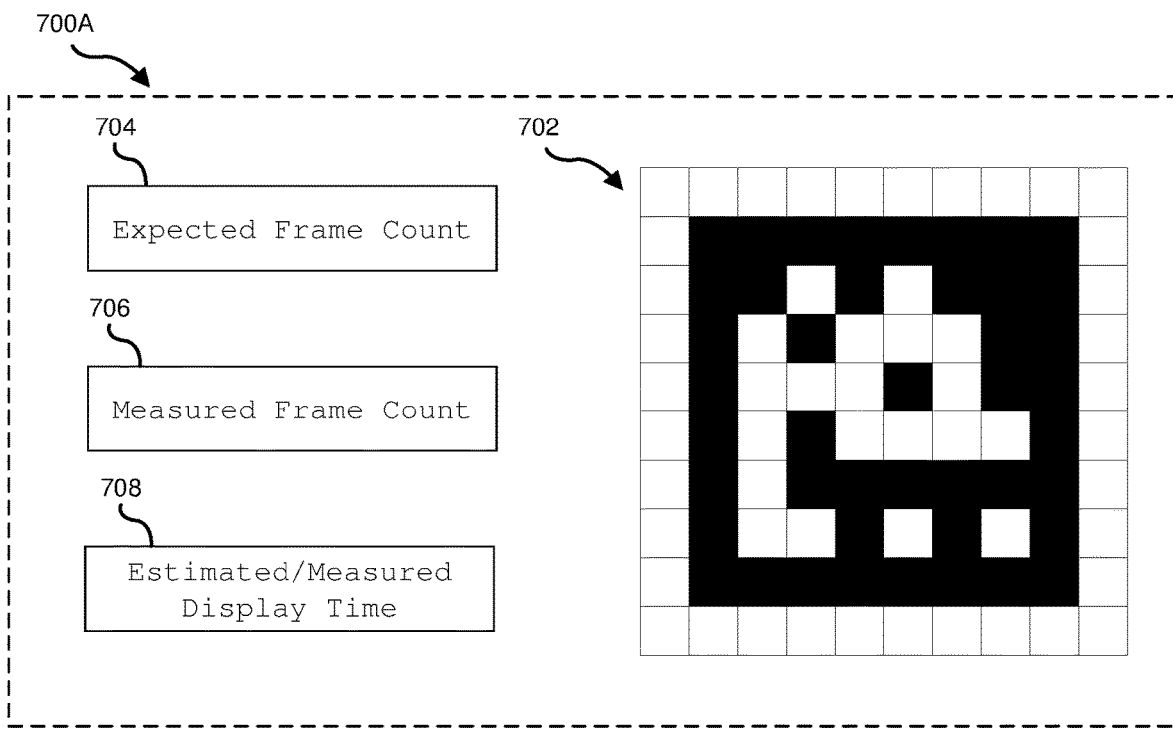
FIGS. 7A and 7B show exemplary displays that may be viewed by the calibration system of FIG. 5 during testing, according to some embodiments.
Figure 7B:
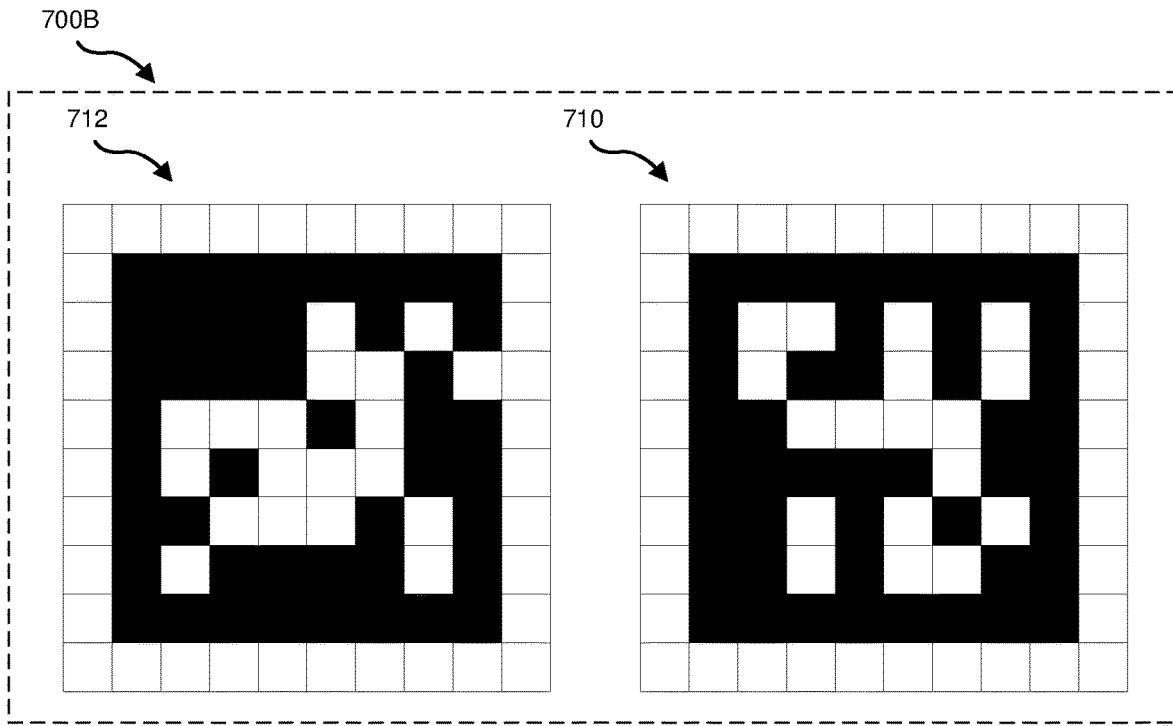

FIGS. 7A and 7B show exemplary displays of rendered features that may be captured by the capture device 506 and by the calibration system 500 of the FIG. 5 during testing, according to some embodiments. For example, the calibration coordinator 502 may instruct the electronic display 304 to render features 700A, which may include at least one binary code 702, within a frame. As detailed above, the capture device 506 may then capture an image of the frame that includes the rendered features 700A. In some examples, in addition to the binary code 702, the rendered features 700A may include alphanumeric representations of estimated and measured values related to the calibration. For example, the rendered features may include an alphanumeric value for an expected frame count 704, a measured frame count 706, and/or an estimated and/or measured display time 708, among other possible performance metrics. The frame counts may be associated with the sequential series of binary codes, which may be repeated multiple times during a test. For example, the frame counts may range from 0 to 499, when the set of binary codes includes 500 different binary codes. The series of 500 codes may, for example, be shown 10 or more times during a calibration procedure. The associated data shown in the rendered features 704, 706, and/or 708 may also be communicated to the calibration coordinator 502 directly, in some embodiments.

When a difference between a predicted performance value and an actual performance value is detected (e.g., when a difference between a predicted display time encoded within a binary code overlaid onto a frame and the actual display time for the frame is detected), an associated calibration parameter may be generated by the calibration system 500. In some examples, and as described in greater detail herein, this calibration parameter may be generated based on a statistical analysis of a multitude of samples. For example, if processor 508 detects an error in the predicted display time, then processor 508 may generate a calibration parameter that corrects the same based on the mean or median distribution of differences between predicted and measured display times. The calibration system 500 may then log the information with an identifier of the particular HMD device 300 (or component of the HMD device 300 related to the performance value in question). Additionally, the calibration system may provide the calibration parameter or parameters to the HMD device 300 itself so that future predictions of display times (and consequently where in the electronic display 304 a feature should be rendered) can be more accurate. This may allow for improved correlation between the added visuals projected by the electronic display 304 and the local environment 301.

In some examples, the above-described image capture operations may be separated (e.g., temporally and/or physically) from the operations used to (1) identify the performance metrics contained within the captured images, (2) measure the performance of one or more aspects of the HMD device 300 based on the same, and/or (3) calibrate the HMD device 300 accordingly. For example, in one embodiment the calibration coordinator 502 may only perform the above-described identification, measurement, and/or calibration processes upon capturing a sufficiently large number of samples (as opposed to performing each of these steps on each captured sample in real-time). Additionally or alternatively, a completely separate device (such as a performance analysis engine that is separate from the calibration coordinator 502) may perform all image-analysis and calibration-related steps. By doing so, the time and/or computing resources spent processing each captured image may not skew or otherwise negatively impact the captured time values (e.g., timestamps) associated with each sample.

In one example, the rendered features may include multiple binary codes, such as a first binary code 710 and a second binary code 712 within rendered features 700B. In this example, the binary codes 710 and 712 may be used to provide different information. For example, the binary code 712 may represent or encode a predicted display time for a frame, while the binary code 710 may represent or encode a frame counter. Embodiments of the present disclosure may also include rendered features that include combinations of those shown in the rendered features 700A and 700B of FIG. 7. As with rendered features 700A, the rendered features 700B may also be displayed by the HMD device 300 and the overlaid image may be captured by the capture device 506. Although two binary codes are illustrated in FIG. 7, any number of codes (or rendered features) may be included in a single frame or sample.

Figure 8:
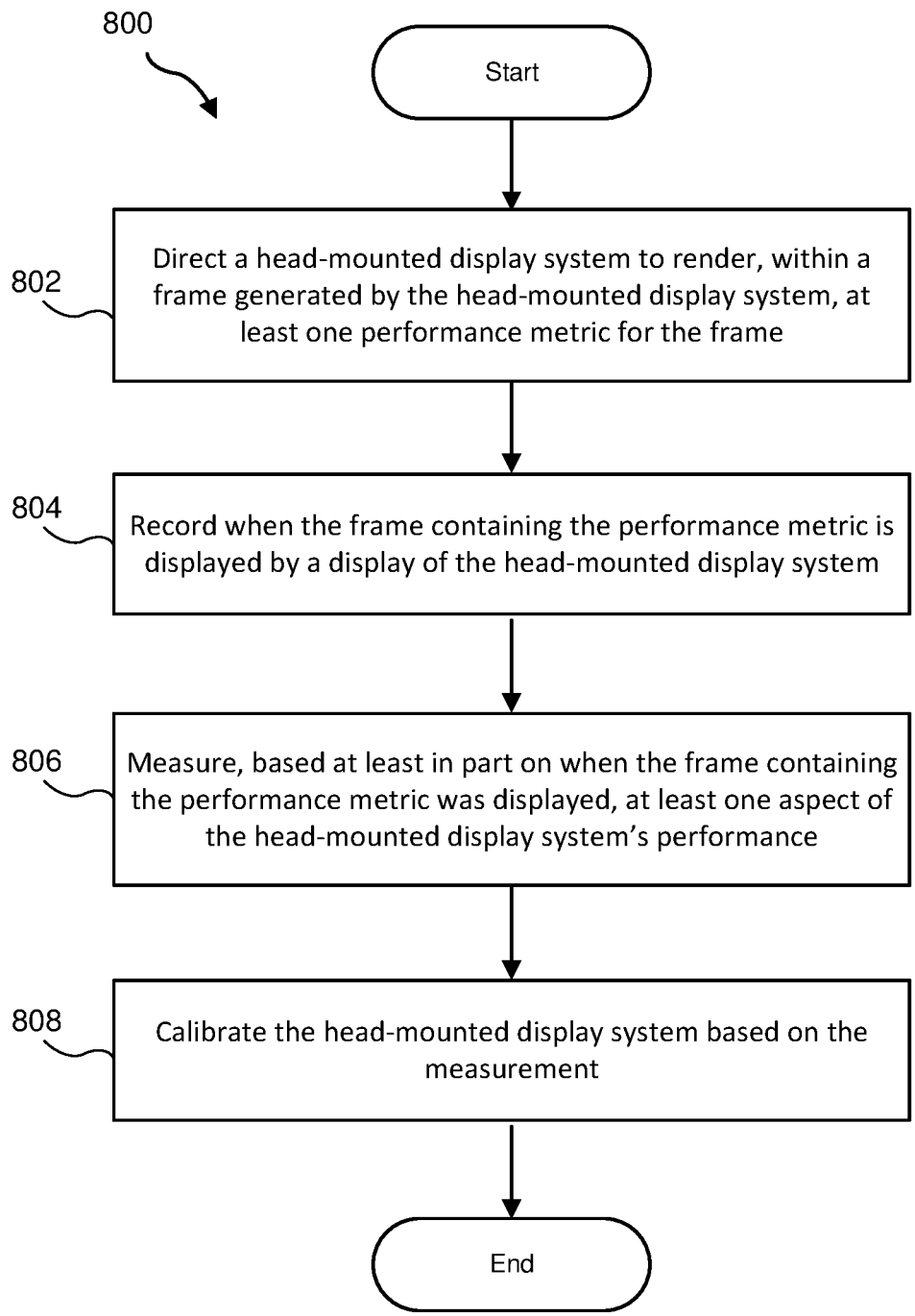
FIG. 8 is a flow chart of a method of calibrating an HMD system, according to some embodiments.

FIG. 8 is a flow chart of an exemplary method 800 of calibrating an HMD system, such as the HMD system 100 of FIG. 1. Embodiments of the method 800 may include additional operations before, after, in between, or as part of the enumerated operations. Some embodiments of the method 800 may be performed by the calibration system 500 in connection with other components of the HMD system 100. Additionally, some embodiments of the method 800 may include a set of instructions, stored on a computer-readable storage medium, that when executed by a processing device, such as the processor 508 or the processing subsystem 110, cause the processing device to perform some or all of the operations included in embodiments of the method 800. In some embodiments, the operations may be performed in a sequence that is different than the sequence depicted in FIG. 8.

At an operation 802, a processing device may direct a head-mounted display system to render, within a frame generated by the head-mounted display system, one or more performance metrics for the frame. For example, the calibration coordinator 502 may direct the HMD device 300 of the HMD system 100 to render a frame including the reference features 700A or 700B from FIG. 7.

At an operation 804, the processing device may record when the frame containing the performance metric is actually displayed by a display of the head-mounted display system. For example, the capture device 506 of the calibration system 500 may capture an image of a rendered frame projected by the electronic display 304. In some embodiments, the calibration coordinator 502 may communicate with the capture device 506 to identify or record when the frame is captured by the capture device 506 (thus indicating when the frame is actually displayed by the electronic display 304).

At an operation 806, the processing device may measure at least one aspect of the head-mounted display system's performance based at least in part on when the frame containing the performance metric was displayed. For example, the calibration coordinator 502 may measure the mean or median distribution of differences between predicted and measured display times.

At an operation 806, the processing device may calibrate the head-mounted display system based on the measurement. In one example, the calibration coordinator 502 may communicate with the HMD device 300 to improve the accuracy of predicted frames. For example, the calibration system 500 may determine that the average or mean difference between the predicted frame display time and the measured frame display time of electronic display 304 is 0.5 microseconds. The HMD device 300 may then use this information to more accurately predict display time points (resulting in more accurate motion predictions) so that the frames will be aligned with features of the real-world environment even when the HMD device 300 is being subjected to movement by the user.

In some embodiments, the calibration coordinator 502 may direct the head-mounted display system to render the performance metric within the frame by directing the head-mounted display system to render a machine-readable representation of the performance metric within the frame. As detailed above, this machine-readable representation may be a numeral or a binary code, such as a QR code or an AprilTag. Other machine-readable representations may include a barcode or any other suitable two-dimensional code that may visually encode information.

In some examples, in order to measure the performance of the head-mounted display system, the calibration system 500 may (1) determine, using a timestamp obtained from the capture device 506, when the frame was captured by an image sensor of the head-mounted display system (which in turn indicates when the frame was actually displayed on the electronic display 304 of the HMD device 300) and then (2) compare the frame's actual display time with the predicted display time represented by the performance metric contained within the frame.

In one example, the capture device 506 may include an internal clock that records the time at which any image is captured by the capture device 506. In other embodiments, the capture time may be recorded when the captured image is provided to the calibration coordinator 502. In some examples, the calibration coordinator 502 may receive a timestamp for the image capture in addition to a timestamp from the HMD device 300 indicating when the instruction to display the frame was received or processed by the electronic display 304. In these examples, the timestamp from the image capture device 506 minus the timestamp from the electronic display 304 of HMD device 300 may yield an actual render time. This actual render time may be compared with a predicted render time by subtraction to determine a difference. The difference may indicate an error that can be compensated for by properly calibrating the HMD device 300 to more accurately predict render times.

In some embodiments of the method 800, the processing device may use the frame identifier to identify a reported display time for the frame that was reported by a subsystem of the head-mounted display system and may compare the reported display time with the actual display time. For example, the calibration coordinator 502 may identify an AprilTag in a frame that indicates the number or position of that frame in a sequence of frames. The calibration coordinator 502 may then identify the reported display time associated with that frame in a table of reported display times. The processing device may also direct the head-mounted display system to render the performance metric for each of a plurality of additional frames generated by the head-mounted display system and record when the additional frames containing the performance metric are displayed by the display of the head-mounted display system.

In some examples, the measurement of at least one aspect of the head-mounted display system's performance may be based at least in part on an aggregation of when the additional frames containing the performance metric were displayed. For example, an actual average display time may be determined by obtaining thousands of samples of individual display times. The thousands of samples may be collected into a histogram and a median display time can be determined. In this way, the head-mounted display system's performance with respect to a single metric may be based on a large set of samples of that metric to better account for small, random variations.

In some embodiments of the method 800, the processing device may direct the head-mounted display system to render frames at a frequency that is higher than a frame rate of an image sensor used by the head-mounted display system to capture the frame. For example, the calibration coordinator 502 may direct that frames be rendered and displayed on the electronic display 304 at approximately 90 Hz, with approximately 2 ms of persistence in the display of each frame. Similarly, the capture device 506 may be directed to capture frames at a rate of approximately 59 Hz, with approximately 2 ms of exposure for each captured image. In some examples, the processing device may direct the head-mounted display system to display the performance metric for an amount of time that is approximately equal to an exposure length of an image sensor used by the head-mounted display system to capture the frame. When the estimated display time is included in the rendered features included in a frame, that estimated display time may be displayed for 2 ms, while the capture device 506 captures images with a 2 ms exposure time.

In another example, the image sensor used by the head-mounted display system may represent a high-speed capture device with an exposure time that is a fraction of the display's persistency. For example, the capture device 506 may represent a 2,000 Hz camera designed to capture frames at a rate of 2,000 times per second with an exposure time of 500 microseconds. In this example, the high frame rate and short exposure time of the capture device 506 may improve the overall measurement accuracy of the system and ensure that displayed frames are not missed. In another example, the image sensor might be synchronized with the display frame rate. For instance, the camera might be triggered by the display (or vice versa) such that the "display on duration" and the camera exposure time are center-aligned. This will improve the overall measurement accuracy, since there is no phase shift between the camera capture and the displayed frame.

In some embodiments of the operation 808, the processing device may calibrate one or more aspects of the head-mounted display system, such as a display of the head-mounted display system, a sensor of the head-mounted display system, a display-rendering property of the head-mounted display system, a display-timing property of the head-mounted display system, and/or any other time-sensitive subsystem, component, or property of the head-mounted display system. For example, the calibration coordinator 502 may calibrate the electronic display 304 such that the HMD device 300 is able to predict when a frame will be displayed with greater accuracy.

As detailed above, by identifying and measuring the latencies associated with various stages involved in sensing a real-world environment and in rendering frames for augmentative display, the disclosed systems may dramatically improve synchronization between the external environment and added virtual components. This improved synchronization may, in turn, provide a better user experience by improving the visual appearance of an augmented or mixed-reality view and/or by improving the user's confidence in the association between what the user sees directly through a window or combiner and what is added by the HMD device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for calibrating a head-mounted display system, the method comprising:
   directing the head-mounted display system to render, within a frame generated by the head-mounted display system, at least one performance metric for the frame;
   recording when the frame containing the performance metric is displayed by a display of the head-mounted display system, wherein recording when the frame containing the performance metric is displayed comprises:
      capturing an image of the displayed frame using a camera that is positioned approximately where a user's eyes would be positioned with respect to the display when the head-mounted display system is in use by the user; and
      recording when the image of the displayed frame was captured by the camera;
   measuring, based at least in part on when the frame containing the performance metric was displayed, at least one aspect of the head-mounted display system's performance; and
   calibrating the head-mounted display system based on the measurement.

2. The method of claim 1, wherein directing the head-mounted display system to render the performance metric within the frame comprises directing the head-mounted display system to render a machine-readable representation of the performance metric within the frame.

3. The method of claim 2, wherein the machine-readable representation comprises at least one of:
   a numeral; or
   a binary code.

4. The method of claim 3, wherein the binary code comprises a two-dimensional barcode.

5. The method of claim 1, wherein the image of the displayed frame comprises a computer-generated image.

6. The method of claim 1, wherein the performance metric comprises at least one of:
   a predicted display time that identifies a predicted point in time when the head-mounted display system will display the frame on the display of the head-mounted display system;
   a frame identifier that identifies the frame; or
   a synchronization value that identifies synchronization errors between the display and a graphics processing unit of the head-mounted display system.

7. The method of claim 6, wherein measuring at least one aspect of the head-mounted display system's performance comprises:
   determining, using a timestamp obtained from the camera that captured the displayed frame, an actual display time for the frame; and
   comparing the actual display time with the predicted display time.

8. The method of claim 7, wherein measuring at least one aspect of the head-mounted display system's performance comprises using the frame identifier to identify the frame within a sequence of frames reported by a subsystem of the head-mounted display system.

9. The method of claim 1, further comprising:
   directing the head-mounted display system to render the performance metric for each of a plurality of additional frames generated by the head-mounted display system; and recording when the additional frames containing the performance metric are displayed by the display of the head-mounted display system; and wherein the measurement of at least one aspect of the head-mounted display system's performance is based at least in part on an aggregation of when the additional frames containing the performance metric were displayed.

10. The method of claim 1, wherein directing the head-mounted display system to render the performance metric within the frame comprises directing the head-mounted display system to render frames at a frequency that is higher than a frame rate of an image sensor used by the head-mounted display system to capture the frame.

11. The method of claim 1, wherein directing the head-mounted display system to render the performance metric within the frame comprises directing the head-mounted display system to display the performance metric for an amount of time that is approximately equal to an exposure length of an image sensor used by the head-mounted display system to capture the frame.

12. The method of claim 1, wherein calibrating the head-mounted display system comprises calibrating at least one of:
the display of the head-mounted display system;
a sensor of the head-mounted display system;
a display-rendering property of the head-mounted display system; or
a display-timing property of the head-mounted display system.

13. A calibration system for a head-mounted display system, the calibration system comprising:
at least one memory device; and
a physical processor that, when executing instructions contained within the memory device, causes the calibration system to:
direct the head-mounted display system to render, within a frame generated by the head-mounted display system, at least one performance metric for the frame;
record when the frame containing the performance metric is displayed by a display of the head-mounted display system, wherein recording when the frame containing the performance metric is displayed comprises:
capturing an image of the displayed frame using a camera subsystem that is positioned approximately where a user's eyes would be positioned with respect to the display when the head-mounted display system is in use by the user; and
recording when the image of the displayed frame was captured by the camera;
measure, based at least in part on when the frame containing the performance metric was displayed, at least one aspect of the head-mounted display system's performance; and
calibrate the head-mounted display system based on the measurement.

14. The calibration system of claim 13, wherein the camera subsystem is configured to capture images of frames displayed by the display of the head-mounted display system.

15. The calibration system of claim 13, wherein the camera subsystem comprises a pair of cameras that are positioned to approximate positions of the user's eyes with respect to the display when the head-mounted display system is in use by the user.

16. The calibration system of claim 15, wherein:
the display comprises a first display and a second display;
a first camera within the pair of cameras is configured to capture images of frames displayed by the first display; and
a second camera within the pair of cameras is configured to capture images of frames displayed by the second display.

17. The calibration system of claim 16, wherein the calibration system is configured to calibrate the first display independent of the second display.

18. A tangible, non-transitory computer-readable medium having instructions stored thereon, that when executed by a physical processor, cause the physical processor to:
direct a head-mounted display system to render, within a frame generated by the head-mounted display system, at least one performance metric for the frame;
record when the frame containing the performance metric is displayed by a display of the head-mounted display system, wherein recording when the frame containing the performance metric is displayed comprises:
capturing an image of the displayed frame using a camera that is positioned approximately where a user's eyes would be positioned with respect to the display when the head-mounted display system is in use by the user; and
recording when the image of the displayed frame was captured by the camera;
measure, based at least in part on when the frame containing the performance metric was displayed, at least one aspect of the head-mounted display system's performance; and
calibrate the head-mounted display system based on the measurement.

19. The tangible, non-transitory computer-readable medium of claim 18, wherein directing the head-mounted display system to render the performance metric within the frame comprises directing the head-mounted display system to render a machine-readable representation of the performance metric within the frame.

20. The tangible, non-transitory computer-readable medium of claim 19, wherein the machine-readable representation comprises a two-dimensional barcode.

\* \* \* \* \*